US008831616B2

(12) United States Patent
Chun et al.

(10) Patent No.: US 8,831,616 B2
(45) **Date of Patent: *Sep. 9, 2014**

(54) DATA TRANSFER MANAGEMENT IN A RADIO COMMUNICATIONS NETWORK

(71) Applicant: LG Electronics Inc., Seoul (KR)

(72) Inventors: Sung-Duck Chun, Anyang-si (KR); Young-Dae Lee, Gyeonggi-Do (KR); Myung-Cheul Jung, Seoul (KR); Sung-Jun Park, Gyenggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/762,307

(22) Filed: Feb. 7, 2013

(65) Prior Publication Data

US 2014/0066075 A1 Mar. 6, 2014

Related U.S. Application Data

(63) Continuation of application No. 12/092,063, filed as application No. PCT/KR2006/004422 on Oct. 27, 2006, now Pat. No. 8,406,767.

(60) Provisional application No. 60/732,228, filed on Oct. 31, 2005, provisional application No. 60/732,080, filed on Oct. 31, 2005.

(30) Foreign Application Priority Data

Jul. 6, 2006 (KR) ........................ 10-2006-0063641

(51) Int. Cl.

| | |
|---|---|
| ***H04W 36/00*** | (2009.01) |
| ***H04W 36/02*** | (2009.01) |
| ***H04W 48/12*** | (2009.01) |
| ***H04W 36/38*** | (2009.01) |
| *H04W 72/00* | (2009.01) |

(52) U.S. Cl.

CPC .......... *H04W 36/385* (2013.01); *H04W 72/005* (2013.01); *H04W 36/02* (2013.01); *H04W 48/12* (2013.01)

USPC ........ 455/438; 455/436; 455/442; 455/435.1; 455/452.1; 455/522; 370/331

(58) Field of Classification Search

CPC ...... H04W 36/30; H04W 36/12; H04W 36/08

USPC ........... 455/438, 436, 442, 435.1, 452.1, 522; 370/331

See application file for complete search history.

(56) References Cited

U.S. PATENT DOCUMENTS 5,404,355 A 4/1995 Raith
5,697,055 A 12/1997 Gilhousen et al.

(Continued)

FOREIGN PATENT DOCUMENTS

CN 1371576 9/2002
CN 1505912 6/2004

(Continued)

OTHER PUBLICATIONS

U.S. Appl. No. 12/092,055, Office Action dated Jan. 30, 2014, 16 pages.

(Continued)

*Primary Examiner* — Nghi H Ly

(74) *Attorney, Agent, or Firm* — Lee, Hong, Degerman, Kang & Waimey

(57) ABSTRACT

A mobile communications system including a network with a source network node and a target network node that supports a handover procedure, and a mobile terminal that is allowed to access the source network node and access the target network node according to the handover procedure, in which information related to a reception status of user data is delivered between at least two among a group including the mobile terminal, the source network node, and the target network node such that the target network node may receive status information from the source network node and the target network node may receive a status report from the mobile terminal.

7 Claims, 3 Drawing Sheets

(56) References Cited

U.S. PATENT DOCUMENTS 6,359,867 B1 3/2002 Ali-Vehmas
6,532,225 B1 3/2003 Chang et al.
6,563,807 B1 5/2003 Kim et al.
6,625,138 B2 9/2003 Karna et al.
6,628,946 B1 9/2003 Wiberg et al.
6,778,835 B2 8/2004 You et al.
6,845,238 B1 1/2005 Muller
6,920,155 B2 7/2005 Rao
6,968,192 B2 11/2005 Longoni
7,106,814 B2 9/2006 Carsello
7,123,910 B2 10/2006 Lucidarme et al.
7,430,420 B2 9/2008 Derakhshan et al.
7,471,948 B2 12/2008 Farnsworth et al.
7,535,846 B2 5/2009 Kim et al.
7,551,937 B2 6/2009 Kim et al.
7,809,373 B2 10/2010 Park et al.
7,983,676 B2 7/2011 Ju et al.
8,134,974 B2 * 3/2012 Chun et al. .................... 370/331
8,406,767 B2 * 3/2013 Chun et al. .................... 455/438
2001/0016496 A1 8/2001 Lee
2001/0026543 A1 10/2001 Hwang et al.
2001/0030956 A1 10/2001 Chillariga et al.
2001/0036113 A1 11/2001 Jurgensen et al.
2002/0045448 A1 4/2002 Park et al.
2002/0048266 A1 4/2002 Choi et al.
2002/0051431 A1 5/2002 Choi et al.
2002/0052206 A1 5/2002 Longoni
2002/0071480 A1 6/2002 Marjelund et al.
2002/0085516 A1 7/2002 Bridgelall
2002/0122393 A1 9/2002 Caldwell et al.
2002/0159412 A1 10/2002 Odenwalder et al.
2002/0181436 A1 12/2002 Mueckenheim et al.
2003/0002472 A1 1/2003 Choi et al.
2003/0026324 A1 2/2003 Li et al.
2003/0035440 A1 2/2003 Casaccia et al.
2003/0053344 A1 3/2003 Herrmann
2003/0054829 A1 3/2003 Moisio
2003/0076812 A1 4/2003 Benedittis
2003/0081586 A1 5/2003 Malladi et al.
2003/0095552 A1 5/2003 Bernhard et al.
2003/0131300 A1 7/2003 Park et al.
2003/0202489 A1 10/2003 Lee
2003/0207696 A1 11/2003 Willenegger et al.
2004/0009767 A1 1/2004 Lee et al.
2004/0022217 A1 2/2004 Korpela et al.
2004/0029532 A1 2/2004 Schwarz et al.
2004/0053614 A1 3/2004 Il-Gyu et al.
2004/0085926 A1 5/2004 Hwang et al.
2004/0103435 A1 5/2004 Yi et al.
2004/0114574 A1 6/2004 Zeira et al.
2004/0127244 A1 7/2004 Matsumoto et al.
2004/0152478 A1 8/2004 Ruohonen et al.
2004/0162072 A1 8/2004 Sigle et al.
2004/0171401 A1 9/2004 Balachandran et al.
2004/0185852 A1 9/2004 Son et al.
2004/0264497 A1 12/2004 Wang et al.
2005/0059437 A1 3/2005 Son et al.
2005/0094586 A1 5/2005 Zhang et al.
2005/0105488 A1 5/2005 Raji et al.
2005/0105505 A1 5/2005 Fishler et al.
2005/0107105 A1 5/2005 Wakabayashi
2005/0119004 A1 6/2005 Gao et al.
2005/0138528 A1 6/2005 Ameigeiras et al.
2005/0153700 A1 7/2005 Farnsworth et al.
2005/0159161 A1 7/2005 Florkey et al.
2005/0177623 A1 8/2005 Roberts et al.
2005/0181801 A1 8/2005 Funnell
2005/0197132 A1 9/2005 Lee et al.
2005/0227691 A1 10/2005 Pecen et al.
2005/0271025 A1 12/2005 Guethaus et al.
2005/0282547 A1 12/2005 Kim et al.
2006/0039327 A1 2/2006 Samuel et al.
2006/0056355 A1 3/2006 Love et al.
2007/0010268 A1 1/2007 Kim et al.
2007/0032255 A1 2/2007 Koo et al.
2007/0049344 A1 3/2007 Van Der Velde et al.
2007/0117563 A1 5/2007 Terry et al.
2007/0133458 A1 6/2007 Chandra et al.
2007/0147315 A1 6/2007 Khoury et al.
2007/0155388 A1 7/2007 Petrovic et al.
2008/0062905 A1 3/2008 Goldberg et al.
2008/0123585 A1 5/2008 Granzow et al.
2008/0198763 A1 8/2008 Fischer et al.
2008/0253323 A1 10/2008 Fischer
2008/0254800 A1 10/2008 Chun et al.
2008/0268852 A1 10/2008 Petrovic et al.
2008/0285668 A1 11/2008 Lee et al.
2008/0293423 A1 11/2008 Park et al.
2008/0298319 A1 12/2008 Lee et al.
2009/0207810 A1 8/2009 Petrovic et al.
2010/0330998 A1 12/2010 Park et al.

FOREIGN PATENT DOCUMENTS

CN 1567769 1/2005
EP 0939569 9/1999
EP 1220490 7/2002
EP 1326460 7/2003
EP 1505782 2/2005
EP 1519519 3/2005
EP 1553798 7/2005
EP 1565026 8/2005
GB 2332340 6/1999
JP 09-186704 7/1997
JP 10-136426 5/1998
JP 11068820 3/1999
JP 11-146462 5/1999
JP 11196477 7/1999
JP 11-341541 12/1999
JP 2000-069531 3/2000
JP 2001-078246 3/2001
JP 2001-313968 11/2001
JP 2002-291015 10/2002
JP 2003-500950 1/2003
JP 2003-087842 3/2003
JP 2003-111148 4/2003
JP 2003102055 4/2003
JP 2003-152600 5/2003
JP 2003-338832 11/2003
JP 2003324761 11/2003
JP 2004-135287 4/2004
JP 2004-208177 7/2004
JP 2004-221760 8/2004
JP 2004-289234 10/2004
JP 2005-072682 3/2005
JP 2005-509313 4/2005
JP 2005-124215 5/2005
JP 2005513907 5/2005
JP 2005-525065 8/2005
JP 2005-237031 9/2005
JP 2005-260337 9/2005
JP 2005-277570 10/2005
JP 2006-507753 3/2006
JP 2007-502557 2/2007
KR 10-2003-0007481 1/2003
KR 10-2003-0056143 7/2003
KR 1020030080946 10/2003
KR 10-2004-0035511 4/2004
KR 10-0430562 5/2004
KR 10-2005-0032285 4/2005
KR 1020050032949 4/2005
KR 10-0496156 6/2005
KR 10-2005-0078635 8/2005
KR 10-2005-0084908 8/2005
KR 1020050078636 8/2005
KR 10-0688303 3/2007
RU 2145774 2/2000
RU 2149518 5/2000
RU 2216100 11/2003
TW 486895 5/2002
TW 517488 1/2003
TW 576054 2/2004
TW I236241 7/2005
WO 00/72609 11/2000

(56) References Cited

FOREIGN PATENT DOCUMENTS

| | | |
|---|---|---|
| WO | 00/74420 | 12/2000 |
| WO | 01/05121 | 1/2001 |
| WO | 01/35586 | 5/2001 |
| WO | 02/09825 | 2/2002 |
| WO | 0241509 | 5/2002 |
| WO | 03017544 | 2/2003 |
| WO | 03/088691 | 10/2003 |
| WO | 03/096149 | 11/2003 |
| WO | 03-096731 | 11/2003 |
| WO | 03-103320 | 12/2003 |
| WO | 2004/017541 | 2/2004 |
| WO | 2004016007 | 2/2004 |
| WO | 2004016016 | 2/2004 |
| WO | 2004/089013 | 10/2004 |
| WO | 2005/011134 | 2/2005 |
| WO | 2005/018255 | 2/2005 |
| WO | 2005/060132 | 6/2005 |
| WO | 2005/072073 | 8/2005 |
| WO | 2005/078966 | 8/2005 |
| WO | 2005/083912 | 9/2005 |
| WO | 2005/089002 | 9/2005 |

OTHER PUBLICATIONS

U.S. Appl. No. 12/092,060, Final Office Action dated Mar. 24, 2014, 10 pages.

The State Intellectual Property Office of the People's Republic of China Application Serial No. 200680040353.8, Office Action dated, Jan. 5, 2013, 6 pages.

State Intellectual Property Office of the People's Republic of China Application Serial No. 2012122800984210, Office Action dated Jan. 5, 2013, 6 pages.

U.S. Appl. No. 13/487,081 Notice of Allowance dated Jan. 4, 2013, 11 pages.

Qualcomm Europe, "L2 Buffer Management at E-UTRAN Cell Change", R2-052475, 3GPP TSG-RAN WG2 meeting #48bis, Oct. 2005, XP-002670656, 5 pages.

Nec et al., "EUTRAN handover procedure for LTE_ACTIVE", R3-051106, Joint RAN2-RAN3 #48bis LTE, Oct. 2005, XP-050158616, 3 pages.

Draft Amendment to IEEE Standard for Local and metropolitan area networks, "Part 16: Air Interface for Fixed and Mobile Broadband Wireless Access Systems; Amendment for Physical and Medium Access Control Layers for Combined Fixed and Mobile Operation in Licensed Bands", IEEE P802.16e/D12, Oct. 2005, XP-002670655, 8 pages.

NTT DoCoMo, Inc. et al., "System Information Structure in LTE", R2-062162, 3GPP TSG-RAN WG2 #54, Aug. 2006, XP002465834, 4 pages.

Nokia, "On the DL frequency resource block dimensioning", R1-051091, 3GPP TSG RAN WG1 Meeting #42bis, Oct. 2005, XP050100706, 4 pages.

LG Electronics, "Downlink Channels and Mapping for Evolved UTRA", R2-052393, TSG-RAN Working Group 2 #48bis, Oct. 2005, XP050129506, 4 pages.

3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Radio interface protocol aspects (Release 7)", 3GPP TR 25.813 V7.0.0, Jun. 2006, 3 pages.

Nokia, "Intra-radio access mobility, Handover in LTE_ACTIVE", 3GPP TSG-RAN WG2#50, R2-060053, Jan. 2006, 3 pages.

Nokia et al., "Intra-LTE Handover operation", 3GPP TSG-RAN WG2 Meeting #53, R2-061135, May 2006, 3 pages.

Nokia et al., "E-UTRA Transport Channels", 3GPP TSG-RAN WG2 Meeting #48bis, R2-052438, Oct. 2005, 3 pages.

NTT DOCOMO, "Physical Channel Structures for Evolved UTRA", 3GPP TSG-RAN WG1 Meeting #41, R1-050464, May 2005, 13 pages.

NTT DOCOMO et al., "Physical Channels and Multiplexing in Evolved UTRA Downlink", 3GPP TSG-RAN WG1 #42 on LTE, R1-050707, Aug. 2005, 15 pages.

IEEE Standard, "Part 16: Air Interface for Fixed Broadband Wireless Access Systems," IEEE Std 802.16, Oct. 2004, 7 pages.

NTT DoCoMo, et al, "Multiplexing Method of Shared Control Channel in Uplink Single-Carrier FDMA Radio Access," TSG-RAN WG1#42bis, R1-051143, Oct. 10, 2005, 9 pages.

LG Electronics, "Functions of E-RRC and E-MAC," TSG-RAN Working Group 2 #48bis, R2-052768, Oct. 10, 2005, 2 pages.

J. Kong et al., "A Secure Ad-Hoc Routing Approach Using Localized Self-Healing Communities," Proceedings of the 6th ACM International Symposium on Mobile Ad Hoc Networking and Computing, pp. 254-265, May 2005.

Onoe, et al., "Control Channel Structure for TDMA Mobile Radio Systems," 40th IEEE Vehicular Technology Conference, May 1990, 6 pages.

U.S. Appl. No. 12/092,060, Office Action dated Dec. 4, 2013, 10 pages.

3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Radio interface protocol aspects (Release 7)," 3GPP TR 25.813 V7.0.0, Jun. 2006, 39 pages.

Japan Patent Office Application Serial No. 2012-179500, Office Action dated Nov. 26, 2013, 4 pages.

InterDigital Communication, "Intra-LTE Handover—Context Transfer and Data forwarding," R3-060751, 3GPP TSG RAN3 #52, May 2006, XP50159655, 11 pages.

Siemens, "SDU Forwarding During Intra-LTE Hand-over," R3-060775, 3GPP TSG RAN WG3 Meeting #52, Apr. 2006, XP50159678, 3 pages.

European Patent Office Application Serial No. 06812263.9, Office Action dated Feb. 26, 2013, 8 pages.

SAMSUNG, "Downlink Signaling requirement for MBMS," 3GPP TSG-RAN WG2 meeting #30, R2-021670, Jun. 2002, 3 pages.

InterDigital Communication, "Intra-LTE Handover—Context Transfer and Data forwarding," 3GPP TSG RAN3#52, R3-060751, May 2006, 11 pages.

Intellectual Property Office of India Application Serial No. 1373/KOLNP/2008, Search Report dated Jul. 22, 2013, 2 pages.

Intellectual Property Office of India Application Serial No. 1326/KOLNP/2008, Search Report dated Jul. 30, 2013, 1 page.

European Patent Office Application Serial No. 13002307.0, Search Report dated Aug. 14, 2013, 7 pages.

European Patent Office Application Serial No. 06812212.6, Office Action dated Aug. 20, 2013, 5 pages.

3rd Generation Partnership Project (3GPP), "Technical Specification Group Radio Access Network; Radio Resource Control (RRC); Protocol Specification (Release 6)," 3GPP TS 25.331 V6.7.0, Sep. 2005, 1167 pages.

* cited by examiner

DATA TRANSFER MANAGEMENT IN A RADIO COMMUNICATIONS NETWORK

CROSS-REFERENCE TO RELATED APPLICATIONS

This application is a continuation of U.S. patent application Ser. No. 12/092,063, filed on Apr. 29, 2008, now U.S. Pat. No. 8,406,767, which is the National Stage filing under 35 U.S.C. 371 of International Application No. PCT/KR2006/004422, filed on Oct. 27, 2006, which claims the benefit of earlier filing date and right of priority to Korean Application No. 10-2006-0063641, filed on Jul. 6, 2006, and also claims the benefit of U.S. Provisional Application Ser. Nos. 60/732,080, filed on Oct. 31, 2005, and 60/732,288, filed on Oct. 31, 2005, the contents of which are all hereby incorporated by reference herein in their entirety.

TECHNICAL FIELD

The present disclosure relates to a wireless (radio) mobile communications system and a wireless (radio) terminal that provide wireless communications.

BACKGROUND ART

In the wireless system, when a mobile terminal that is currently accessing a first node of the wireless network then accesses a second node (different from the first node) of the wireless network, the first node and the mobile terminal deliver to the second node, information related to transmission and reception acknowledgement which minimizes unnecessary duplicate transmission of data and minimizes transmission delays for new data.

To support broadband wireless access technologies (e.g., WiMAX), them are different types of broadband wireless (air) interfaces, such as cellular 3G technologies (e.g., UMTS, WCDMA, etc.), and multi-carrier based multiple access techniques (e.g., OFDMA, OFDM-TDMA, OFDM-CDMA, etc.). Frequency division multiplexing involves sub-channelization, of which at least four types (OFDM, Flash OFDM, sOFDMA and OFDMA) exist.

Orthogonal Frequency Division Multiplexing (OFDM) involves the splitting of a radio signal into multiple smaller sub-signals that are then transmitted simultaneously at different frequencies to a receiver. OFDM refers to a form of multi-carrier transmission where all the sub-carriers are orthogonal to each other. Certain IEEE standards and 3GPP standards are related to various aspects of OFDM. For example, portions of the 3GPP standard related to various aspects of Long-Term Evolution (LTE) (such as E-UMTS) are based upon OFDM concepts.

FIGS. 1 and 2 show examples of an Evolved Universal Mobile Telecommunications System (E-UMTS). The E-UMTS system is a system that has evolved from the UMTS system, and its standardization work is currently being performed by the 3GPP standards organization.

As shown in FIGS. 1 and 2, the E-UMTS network is generally comprised of a core network (CN), an E-UTRAN and a terminal (e.g., UE). The E-UTRAN is comprised of a base station (i.e., eNode B or eNB) and an access node (such as an access gateway (AG)) that is located at an end of the E-UMTS network and connects with one or more external networks. The AG can be divided into a portion that handles user traffic and a portion that handles control traffic. In such case, the AG that handles user traffic and the AG that handles control traffic can communicate with each other via a newly defined interface. For one eNode B, one or more cells may exist. Between the eNode Bs, an interface for transmitting user traffic and control traffic may be employed. The core network (CN) may be comprised of nodes and the like that are used for registration and other functions for users of the UEs and the AG. Also, an interface for distinguishing the E-UTRAN and the CN may be employed.

Also, in the E-UMTS network, there may be a control plane server (CPS) that performs radio (wireless) control functions, a radio resource management (RRM) entity that performs radio resource management functions, a mobility management entity (MME) that performs mobility management functions for a mobile terminal. Here, it can be understood that the particular names of the various network entities are not limited to those mentioned above.

The various layers of the radio interface protocol between the mobile terminal and the network may be divided into L1 (Layer 1), L2 (Layer 2), and L3 (Layer 3) based upon the lower three layers of the Open System Interconnection (OSI) standard model that is known the field of communication systems. Among these layers, a physical layer that is part of Layer 1 provides an information transfer service using a physical channel, while a Radio Resource Control (RRC) layer located in Layer 3 performs the function of controlling radio resources between the mobile terminal and the network. To do so, the RRC layer exchanges RRC messages between the mobile terminal and the network. The functions of the RRC layer may be distributed among and performed within the Node B, the CPS/RRM and/or the MME.

The radio interface protocol is horizontally comprised of a physical layer, a data link layer, and a network layer, and vertically comprised of a user plane for transmitting user data and a control plane for transferring control signaling. The radio interface protocol layer may be divided into L1 (Layer 1), L2 (Layer 2), and L3 (Layer 3) based upon the lower three layers of the Open System Interconnection (OSI) standards model that is known the field of communication systems.

FIGS. 3 and 4 show exemplary radio protocol architecture according to the 3GPP radio access network standard. Particular layers of the radio protocol control plane of FIG. 3 and of the radio protocol user plane of FIG. 4 will be described below. The physical layer (i.e., Layer 1) uses a physical channel to provide an information transfer service to a higher layer. The physical layer is connected with a medium access control (MAC) layer located thereabove via a transport channel, and data is transferred between the physical layer and the MAC layer via the transport channel. Also, between respectively different physical layers, namely, between the respective physical layers of the transmitting side (transmitter) and the receiving side (receiver), data is transferred via a physical channel.

The MAC layer of Layer 2 provides services to a radio link control (RLC) layer (which is a higher layer) via a logical channel. The RLC layer of Layer 2 supports the transmission of data with reliability. It should be noted that the RLC layers in FIGS. 3 and 4 are depicted in dotted lines, because if the RLC functions are implemented in and performed by the MAC layer, the RLC layer itself may not need to exist. The PDCP layer of Layer 2 performs a header compression function that reduces un necessary control information such that data being transmitted by employing Internet protocol (IP) packets, such as IPv4 or IPv6, can be efficiently sent over a radio (wireless) interface that has a relatively small bandwidth.

The radio resource control (RRC) layer located at the lowermost portion of Layer 3 is only defined in the control plane, and handles the control of logical channels, transport channels, and physical channels with respect to the configuration, re-configuration and release of radio bearers (RB). Here, the RB refers to a service that is provided by Layer 2 for data transfer between the mobile terminal and the UTRAN.

As for channels used in downlink transmission for transmitting data from the network to the mobile terminal, there is a broadcast channel (BCH) used for transmitting system information, and a shared channel (SCH) used for transmitting user traffic or control messages. As for channels used in uplink transmission for transmitting data from the mobile terminal to the network, there is a random access channel (RACH) used for transmitting an initial control message, and a shared channel (SCH) used for transmitting user traffic or control messages.

The features of the RLC layer will be considered in more detail hereafter.

A basic function of the RLC layer is to guarantee the quality of service (QoS) for each radio bearer (RB) and to transmit data accordingly. As the RB service is a service provided by the radio protocol of Layer 2 to an upper layer, the entire Layer 2 effects the QoS, but in particular, the effect of the RLC is large. To guarantee the QoS that is unique to the RBs, the RLC has a separate (independent) RLC entity for each RB, and provides two types of RLC modes to support various QoS, namely, unacknowledged mode (UM) and acknowledged mode (AM). These two RLC modes have differences in their operation methods because of the respectively different QoS that is supported, and thus their detailed functions also have differences. Thus, the RLC should be considered according to its operation mode.

The RLC has two modes; a mode (UM) that does not provide a response or acknowledgement with respect to reception of data that was transmitted, and a mode (AM) that provides a response or acknowledgement. The UM RLC transmits each PDU upon attaching thereto a header that includes a sequence number (SN), which allows a receiver to know what PDUs have been lost during transmission. Due to such function, the UM RLC, in the user plane, handles the transmission of broadcast/multicast data or the transmission of real-time packet data such as voice (e.g., VoIP) and streaming of the packet service (PS) domain, while in the control plane, handles the transmission of RRC messages that do not need reception acknowledgement among the RRC messages transmitted to a particular terminal within a cell or a particular terminal group.

Similar to the UM RLC, the AM RLC forms a PDU by adding a PDU header that contains a sequence number (SN), but unlike the UM RLC, there is a large difference in that the receiver provides an acknowledgement for a PDU transmitted from a transmitter. In AM RLC, the reason why the receiver provides acknowledgement is to allow the receiver to request re-transmission of those PDUs that it had not properly received, and this re-transmission function is the most significant characteristic of the AM RLC. As a result, the purpose of the AM RLC is to guarantee error-free data transmissions through use of re-transmissions, and due to this purpose, the AM RLC typically handles non-real-time packet data transmissions, such as TCP/IP of the PS domain, in the user plane, and handles the transmission of RRC messages that need reception acknowledgement among the RRC messages transmitted to a particular terminal within a cell.

With respect to directional aspects, the UM RLC is used in uni-directional communications, while the AM RLC is used in bi-directional communications because there is feedback from the receiver. Because such bi-directional communications are typically used in point-to-point communications, the AM RLC only employs a dedicated logical channel. There are also differences in structural aspects, whereby the UM RLC has a single type of structure comprised of one RLC entity either for transmission or for reception, but for the AM RLC, both a transmitter and a receiver exist in a single RLC entity.

The reason why the AM RLC is complicated is due to its re-transmission function. For managing re-transmissions, the AM RLC has a re-transmission buffer in addition to a transmission/reception buffer, uses a transmission/reception window for flow control, uses a polling function whereby the transmitter requests a status information from the peer RLC entity in the receiver, uses a status report for the receiver to report its buffer status to the peer RLC of the transmitter, uses a status PDU for carrying status information, uses a piggyback function that inserts a status PDU into a data PDU to increase data transmission efficiency, and performs various other functions. In addition, if the AM RLC entity finds a serious error in its operation procedure, a Reset PDU for requesting the peer AM RLC entity to re-set all operations and parameters, and a Reset Ack PDU for responding to such Reset PDU are employed. Also, to support these functions, the AM RLC requires various types of protocol parameters, state variables, and timers. The PDUs used controlling data transmissions from the AM RLC, such as the status report or status PDU, Reset PDU, and the like, are called Control PDUs, and the PDUs used for delivering user data are called Data PDUs.

A mobile communications system is different than a wired network in that services must be seamlessly provided to terminals that have mobility. Namely, situations where the terminal moves from one region to another different region should be supported. If the terminal moves away from a base station that it is currently accessing and moves closer towards to a new base station, the network should perform the operations to move the access point of the terminal to the new base station. While the terminal disconnects its access with the previous base station and until the access to a new base station is completed, data transmission or reception cannot be performed.

However, all user data has a time limit. For example, for a voice call, voice data (or information) must be transmitted to the recipient within a set time period. Also, data such as TCP must be sent from a transmitter and received by a receiver within a certain time period, and the receiver should send a reception acknowledgement to the transmitter within a certain time period. Otherwise, the transmitter will re-transmit the TCP data.

DISCLOSURE OF INVENTION

Technical Problem

In general, the terminal and base station continuously exchange transmission/reception acknowledgement information with respect to data that was transmitted and received. For example, for TCP packets, if one packet is lost by lower layer entities during transmission, the transmission rate of the TCP entity decreases rapidly. For example, if the TCP entity sends and receives data at 100 Mbits/sec, but if even one packet is lost, the transmission rate of the TCP entity may decrease significantly to, for example, 10 Kbits/sec.

Accordingly, to reduce the effects with respect to TCP packets, the mobile communications system employs a no-loss mode to support data traffic (such as TCP packets) for the air interface (i.e., between the base station and the terminal). This no-loss mode can be considered to be equivalent to using the AM RLC, and if the transmitter does not receive acknowledgement of reception within a certain time period for the data it transmitted, or if a reception failure with respect to such transmitted data is received, such data is re-transmitted.

However, as explained above, re-transmissions are not always performed, but performed only if there is no transmission/reception acknowledgement within a maximum transmission delay time defined for the air interface.

Technical Solution there is a need to provide improved data transfer management in a radio communications network.

Accordingly, the features in this description have been developed in order to solve the above described problems of the related (background) art. The features in this description minimize unnecessary duplicate transmission of user data over the air interface by performing effective data management in the handover procedure for a mobile terminal such that user data transmission rate can be increased to thus improve user satisfaction.

MODE FOR THE INVENTION

Figure 1:
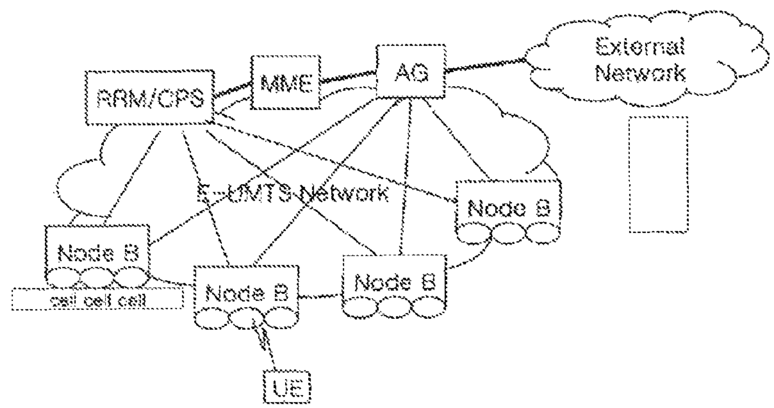
FIG. 1 shows one example of an E-UMTS (LTE) network architecture.
Figure 2:
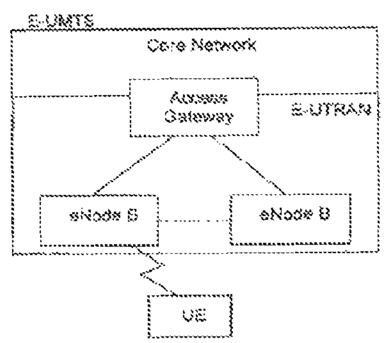
FIG. 2 shows another example of an E-UMTS (LTE) network architecture.
Figure 3:
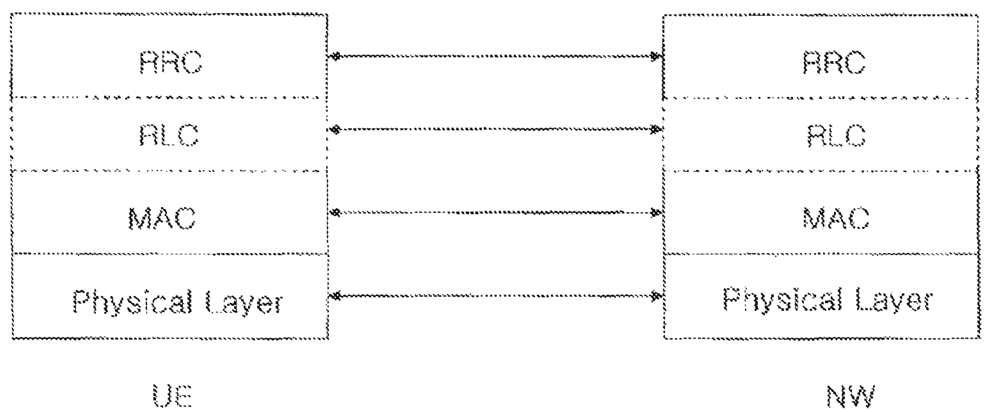
FIGS. 3 and 4 show an exemplary radio interface protocol architecture according to the 3GPP radio access network standard.
Figure 4:
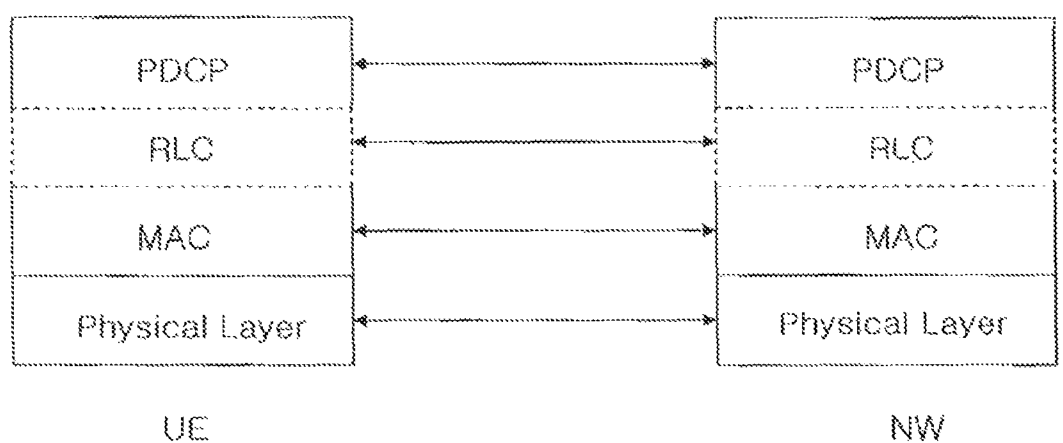

An exemplary handover procedure currently defined in the Long-Term Evolution (LTE) standard will be described. The procedure can be summarized in the following steps, which are only exemplary and not meant to limit any possible additional and/or alternative steps or entities.

1) The mobile terminal transmits a measurement report to the base station (BS) when certain conditions specified by the base station (BS) have been satisfied.

2) The source BS refers to the measurement report from the mobile terminal to make handover determination. The source BS requests the target BS to prepare for handover.

3) After obtaining resources, the target BS delivers to the source BS, configuration information together with a temporary identifier (C-RNTI) with respect to the corresponding mobile terminal. The source BS transmits user data and the like to the target BS.

4) The mobile terminal receives a handover command from the source BS.

5) The mobile terminal re-establishes the radio environment with the target BS. Here, timing synchronization is also included.

6) The target BS responds with timing information. Thereafter, the mobile terminal sends a handover confirm message to the target BS.

7a) The target BS informs the source ES about handover success.

7b) The location of the mobile terminal is updated in the core network (CN).

However, in the above procedure, all downlink user data in the source BS are transmitted to the target BS, and all uplink user data successfully received are transmitted from the source BS to the core network. Also, in the handover procedure, all new downlink user data that arrived at the core network are transmitted from the core network directly to the target BS. The target BS transmits, to the mobile terminal, all user data it received from the core network and the source BS.

In the above-described related (background) art handover procedure, wireless (radio) and wired resources are wasted a great deal. For example, if the source BS transmitted some downlink user data to the mobile terminal, and even if such is properly received by the mobile terminal, because the target BS cannot know this, the same user data is transmitted again to the mobile terminal.

In the same manner, even if the uplink user data transmitted by the mobile terminal is properly received at a corresponding base station before handover begins, if such information had not been delivered to the mobile terminal, the corresponding base station considers that it missed such user data, and requests the mobile terminal to transmit again. Accordingly, if the mobile terminal transmits such user data again, this also results in a waste of radio resources.

This waste of radio resources should be avoided. Such would not matter if there is an infinite amount of radio resources, but because radio resources are limited, the repeated transmission of the same data takes away the transmission opportunities for new data. This would mean that certain user data will not be delivered within a limited amount of time, which thus results in serious degrading in transmission rate.

One aspect of the features in the present description is the recognition by the present inventors regarding the problems and drawbacks of the handover procedure described above and explained in more detail hereafter. Based upon such recognition, the features of the present description have been developed.

The features of the present description may be considered as an improvement over the above-described handover process. For example, the 3GPP standard and the current LTE standard do not adequately address the need to send and receive status information (related to the reception status of various data units) between the network (Node Bs) and the mobile terminal (UE) when handover (or hand off) is performed. More specifically, when performing handover, the source base station (Node B, eNB, etc.) sends information to the target base station (Node B, eNB, etc.) related to the data units received (or not received) on the uplink and/or downlink. Doing so allows improved signaling between the target base station and the mobile terminal (UE) during and after handover. As a result, the waste of limited radio resources is minimized to allow optimal data transmission rates to be employed.

It should be noted that the present description generally deals with the transfer of Internet Protocol (IP) packets, which may be regulated by transmission control protocol (TCP) and user datagram protocol (UDP). In general, TCP utilizes flow control and error correction to guarantee data delivery, and is thus typically used for error-five traffic. In general, UDP is faster than TCP because there is neither flow control nor any error correction, and is thus typically used for streaming audio and video.

As the communication between the source base station and target base station is performed over an IP-based network, the features in the present description may experience some signaling issues. Unlike 3GPP networks that use ATM techniques to support in sequence delivery of data units, re-ordering of data units may be necessary for IP networks. For example, the use of timers or other elements and processing techniques can be used to support the re-ordering function. Also, because the features in the present description employ status reports, other data would not be able to be transmitted when such status reports are sent or received. However, despite these certain issues, the resulting optimization of the handover procedures result in improved data transmission efficiency.

The present disclosure proposes that data reception status information (e.g., status report) be exchanged between the user (e.g., mobile terminal) and the network (e.g., base station) during the handover procedure.

For example, when the mobile terminal transmits a handover confirm message to a new base station, a status report is also transmitted together therewith. A status report message may be included in the handover confirm message. Separate from the handover confirm message, the status report message may be sent and received among RLC entities. Separate from the handover confirm message, the status report message may be sent and received among MAC entities. The status report message may include information related to user data properly received by the mobile terminal. The status report message may include information related to user data not properly received by the mobile terminal. The status report message may include information related to user data with the highest sequence number, among the user data with continuous sequence numbers that was properly received on the downlink by the mobile terminal from the base station that was last accessed before accessing the new base station. The status report message may include the sequence number of the user data that was last delivered to the upper layer by the mobile terminal, among the user data that was received on the downlink by the mobile terminal from the base station that was last accessed before accessing the new base station.

When the previous base station, namely the source base station, sends a handover command to the mobile terminal, a status report is transmitted together therewith. The status report message may include a handover command message. Separate from the handover command message, the status report message may be sent and received among RLC entities. Separate from the handover command message, the status report message may be sent and received among MAC entities. The status report message may include information related to user data properly received by the source base station. The status report message may include information related to user data not properly received by the source base station. The status report message may include information related to user data with the highest sequence number, among the user data received on the uplink by the source base station. The status report message may include the sequence number of the user data last delivered to the upper layer by the source base station, among the user data received on the uplink by the source base station. The status report message may include all the sequence numbers of the user data delivered to the upper layer by the source base station, among the user data received on the uplink by the source base station. The status report message may include all sequence numbers of the user data delivered to the upper layer by the source base station after transmitting a handover command to the mobile terminal, among the user data received on the uplink by the source base station. The upper layer may be a core network. The status report message information may be created based upon the user data transmitted and received up to the time when the source base station sends a handover command to the mobile terminal.

Also, the present disclosure proposes that when a mobile terminal accesses a new base station (i.e., the target base station), that new base station transmits a status report when the mobile terminal performs access while in the region or area managed by that new base station.

When a handover confirm message is received from a mobile terminal, the target base station may include a status report message in its response message. When a handover confirm message is received from a mobile terminal, the target base station may transmit a status report message as its response. Separate from the message used to respond to a handover confirm message, the status report message may be sent and received among RLC entities. Separate from the message used to respond to a handover confirm message, the status report message may be sent and received among MAC entities. The status report message may include information related to user data properly received by the network. The status report message may include information related to user data not properly received by the network. The status report message may include information related to user data with the highest sequence number, among the user data received on the uplink by the network. The status report message may include the sequence number of the user data last delivered to the upper layer by the network, among the user data received on the uplink by the network. The status report message may include all the sequence numbers of the user data delivered to the upper layer by the network, among the user data received on the uplink by the network. The status report message may include all sequence numbers of the user data delivered to the upper layer by the source base station after transmitting a handover command to the mobile terminal, among the user data received on the uplink by the source base station. The upper layer may be a core network. The network may be a source base station, a target base station, or both. The status report message information may be created based upon the user data transmitted and received up to the time when the source base station sends a handover command to the mobile terminal.

After transmitting a handover command, the source base station transmits the downlink user data located in its buffer to the target base station. In this process, among all the downlink user data it has, the source base station transmits to the target base station, only the user data for which reception acknowledgement from the mobile terminal has not been received by the time it transmits a handover command.

After transmitting a handover command, the source base station transmits the downlink user data located in its buffer to the target base station. In this process, among all the downlink user data it has, the source base station transmits to the target base station, only the user data for which reception acknowledgement from the mobile terminal has not been received by the time a reception acknowledgement for the handover command sent to the mobile terminal is received from the mobile terminal. The source base station may inform the target base station about the information related to the user data that it successfully received. After transmitting a handover command to the mobile terminal, the source base station may inform the target base station about the information related to uplink user data received successfully from the mobile terminal and delivered to the core network.

Figure 5:
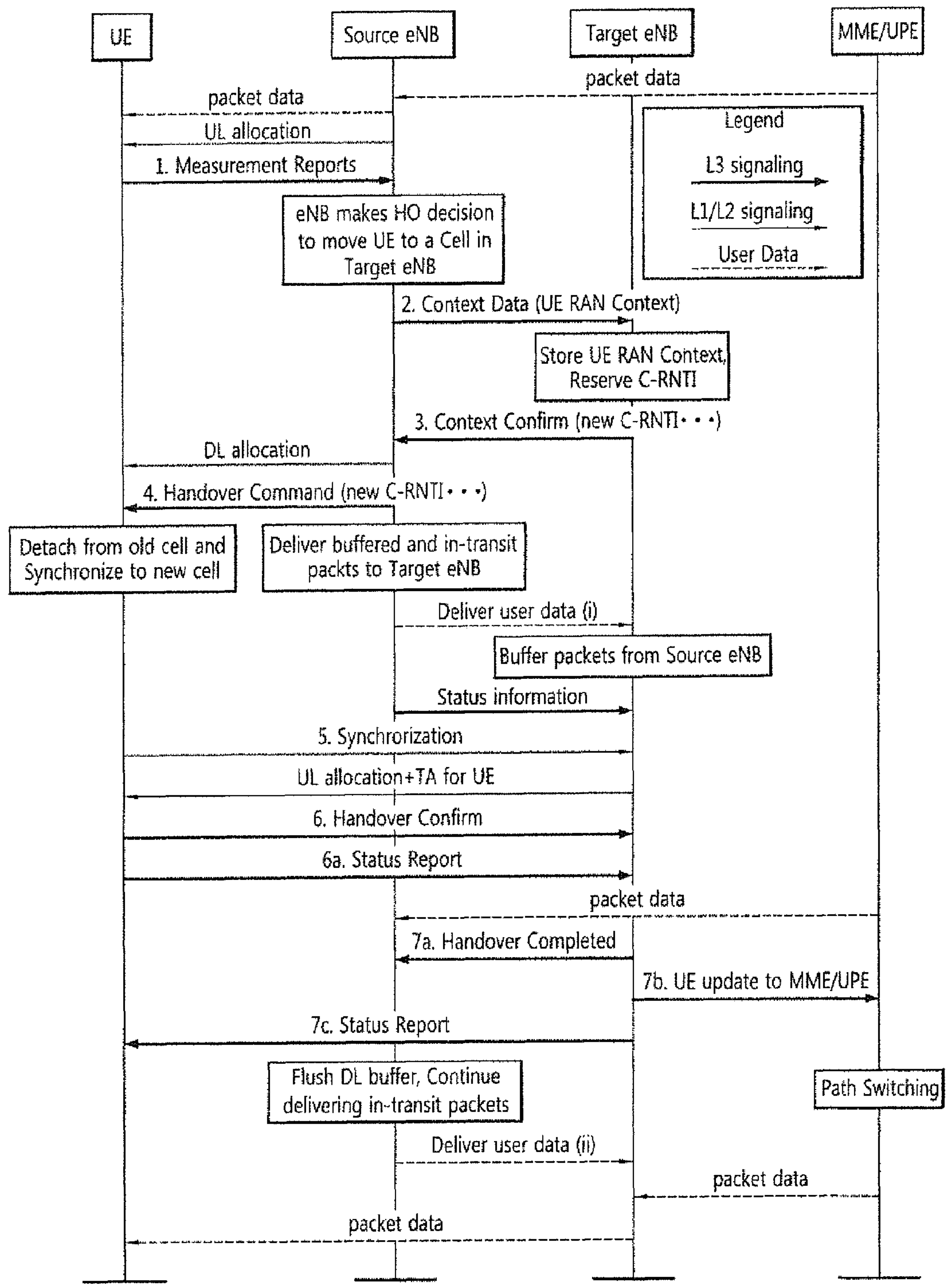
FIG. 5 shows an exemplary handover procedure for one or many possible embodiments of this disclosure.

FIG. 5 shows an example of the handover procedure according to one of many possible embodiments of the present disclosure. The procedure can be summarized in the following steps, which are only exemplary and not meant to limit any possible additional and/or alternative steps or entities that may be employed.

1) The mobile terminal transmits a measurement report to the base station (e.g., Node B: NB; enhanced Node B: eNB; etc.) when certain conditions specified by the base station have been satisfied.

2) The source eNB refers to the measurement report from the mobile terminal to make handover determination. The source eNB requests the target eNB to prepare for handover.

3) After obtaining resources, the target eNB delivers to the source eNB, configuration information together with a temporary identifier (C-RNTI) with respect to the corresponding mobile terminal. The source eNB transmits user data and the like to the target eNB.

4) The mobile terminal receives a handover command from the source eNB. Thereafter, the source base station delivers the downlink user data that it has to the target base station. Here, in addition, the source base station may inform the target base station about the most recent user data transmission and reception information.

5) The mobile terminal re-establishes the radio environment with the target eNB. Here, timing synchronization is also included.

6) The target eNB responds with timing information. Thereafter, the mobile terminal sends a handover confirm message to the target eNB.

6a) Additionally, the mobile terminal transmits reception acknowledgement information to the target eNB.

7a) The target eNB informs the source eNB about handover success.

7b) The location of the mobile terminal is updated in the core network (MME/UPE).

7c) Additionally, the target eNB transmits reception acknowledgement information to the mobile terminal.

Referring to FIG. 5, the exemplary handover process of the present disclosure can also be described in more detail the following manner: As shown in FIG. 5, it should be noted that different types of signaling (e.g., L3 signaling, L1/L2 signaling) and data (e.g. user data) indicated by the various types of arrows are sent and received between the network and the mobile terminal, as well as between certain network entities.

Initially, packet data (i.e., user data) may be delivered from the core network (e.g., MME/UPE) to the mobile terminal (e.g., UE) via a first base station (e.g., source Node B, source eNB, etc.). The source Node B sends uplink (UL) allocation information to the UE, which can then send information on the uplink using appropriately allocated UL resources.

Thereafter, the UE may send information (e.g., a measurement report) related to certain communication characteristics of the UE to the source Node B (step 1). The UE may send such information upon occurrence of certain situations defined by the network (e.g., the base station). Such situations may specify that a measurement report be sent in a periodic manner or upon the occurrence of some event.

Based upon the received information, the source Node B makes a handover (HO) decision to move (i.e. handover) the UE to a cell in a target Node B (e.g., target eNB). Thereafter, the source Node B sends information (e.g., context data) to the target Node B, whereby the context data may contain UE RAN context information (step 2).

Upon receipt, the target Node B stores the context data (UE RAN context) and reserves certain identifiers (e.g., C-RNTI). Then the target Node B may send a context confirmation back to the source Node B, whereby the context confirmation may include the new C-RNTI and other information (step 3).

Upon receiving context confirmation, the source Node B sends downlink (DL) allocation information to the UE. Also, the source Node B may send a handover command to the UE, whereby the handover command may include a new C-RNTI and other information (step 4).

Thereafter, the UE may perform procedures to detach from the old cell (i.e., the source Node B) and synchronize with the new cell (i.e., the target Node B). Here, the source Node B delivers the buffered and in-transit packets to the target Node B, namely, the source Node B delivers user data to the target Node B. Upon receipt, the target Node B stores (buffers) the packets received from the source Node B. Also, the source Node B sends status information to the target Node B to inform about the most recent information regarding transmission and/or reception of packets (user data).

Thereafter, the UE can begin to access the target Node B upon re-establishing the radio environment with the target Node B by sending parameters including timing synchronization to the target Node B (step 5).

The target Node B then sends information to the UE related to uplink (UL) allocation of resources and timing adjustment (TA).

In response, the UE sends a confirmation regarding handover (e.g., a handover confirm message) to the target Node B (step 6). Additionally, the UE sends information regarding the status of transmitted and received packets (e.g. a status report) to the target Node B (step 6a).

As a result, the handover process is can be considered to be completed. The target Node B may send a handover complete message to the source Node B (step 7a). Also, the target Node B may inform the core network (MME/UPE) about the updated status (location) of the UE, namely, that the UE has performed handover (step 7b). Additionally, the target Node B can provide its status report to the UE (step 7c).

While handover is in progress (i.e., before handover completion), the core network may send packet data to the source Node B before being informed of the fact that handover of the UE to the target Node B is being performed. As such, after handover completion (i.e., steps 7a through 7c), the source Node B flushes its downlink (DL) buffer and continues to deliver any packets that are in-transit. Namely, any packets (or user data) received by the source Node B while handover is being performed are then delivered to the target Node B, which then proceeds to send such packets (or user data) to the UE.

Upon being informed of the updated UE location (i.e., UE handover completion), the core network (MME/UPE) performs path switching such that packets that had been sent to the source Node B before handover are now to be sent to the target Node B after handover. As a result, the target Node B transfers the packets received from the core network to the UE such that the user (UE) continues to receive the desired user data or packets in a seamless manner during and after handover.

As described above, the features of present disclosure allow the mobile terminal and the base station to exchange the most recent reception acknowledgement information in the handover process, such that the same user data is not unnecessarily transmitted multiple times over the air interface. Doing so results in an increased data transmission rate and minimizes any service disconnection time that the user may experience.

It can be said that the present disclosure provides a mobile communication system that transmits and receives data via a wireless (radio) interface characterized, in that a handover procedure comprising the steps of discontinuing access to a first base station; establishing access to a second base station; sending a connection acknowledgement message and transmission/reception acknowledgement information to the second base station; and receiving transmission/reception acknowledgement information from the second base station.

The present invention provides a method of data transfer management for a wireless communications system, the method performed by a source network node comprising; receiving a reception status report from a mobile terminal;

transferring the received reception status report to a target network node to support handover, processing the received reception status report by performing appropriate protocol formatting such that the received reception status report is transferred from the source network node to the target network node in the form of reception status information, and deciding a need to perform handover of the mobile terminal from the source network node to the target network node; wherein the reception status report is related to properly received data, not properly received data, or both; the receiving is performed via a wireless interface with the mobile terminal; the transferring is performed via a wired interface with the target network node, and the network node is at least one of a base station, a Node B, or an enhanced Node B.

Also, the present invention provides a method of data transfer management for a wireless communications system, the method performed by a mobile terminal comprising: receiving a handover command from a network; re-establishing a radio link based upon the received handover command; transmitting a reception status report to a target network node on the re-established radio link; sending synchronization information to the target network node; receiving, from the target network node, uplink allocation resources and timing advance information for the mobile terminal; sending a handover confirm message to the target network node indicating that handover is completed; sending the reception status report to the target network node after sending the handover confirm message; and receiving a status report from the target network node after handover is completed; wherein the handover command includes a new temporary identifier for the mobile terminal; the re-establishing step further comprises: detaching from a source network node and synchronizing with the target network node; the reception status report to the target network node is transmitted after sending the handover confirm message; and the reception status report is transmitted using a handover confirm message.

Also, the present invention provides a method of data transfer management for a wireless communications system, the method performed by a source network node comprising: transmitting a handover command to a mobile terminal; transferring downlink user data to a target network node; and transmitting status information to the target network node; transferring a handover confirm message which is received from the mobile terminal to the target network node; wherein the status information indicates information related to transmission and reception of user data.

It should be noted that the features of the present disclosure are related to issues regarding the long-term evolution (LTE) of the 3GPP standard. As such, the 3GPP TS 25.813 (LTE TR) and its related sections or portions thereof, as well as various developing enhancements thereof pertain to the present disclosure. Such enhancements and evolution have resulted in the use of a particular prefix (the letter E) when labeling various network entities (e.g., eNode B), protocol layers, channels, and the like. However, it can be clearly understood that such labeling and other terminology are merely exemplary and thus may be altered (or later clarified) as a result of ongoing or future discussions.

This present disclosure describes various illustrative embodiments. The scope of the claims is intended to cover various modifications and equivalent arrangements of the illustrative embodiments disclosed in this specification. Therefore, the following claims should be accorded the reasonably broadest interpretation to cover modifications, equivalent structures, and features that are consistent with the spirit and scope of the features disclosed herein.

The invention claimed is:

1. A method of performing a handover procedure in a wireless communications system, the method performed by a mobile terminal comprising:

receiving a handover command from a network;

re-establishing a radio link based upon the received handover command;

transmitting a first status report to a target base station on the re-established radio link; and receiving a second status report from the target base station on the re-established radio link, wherein the first status report informs the target base station of user data that has been properly or not properly received by the mobile terminal, and the second status report informs the mobile terminal of user data that has been properly or not properly received by the network.

2. The method of claim 1, wherein the handover command includes a new temporary identifier for the mobile terminal.

3. The method of claim 1, wherein the re-establishing step further comprises:

detaching from a source base station; and synchronizing with the target base station.

4. The method of claim 1, further comprising:

sending synchronization information to the target base station; and receiving, from the target base station, uplink allocation resources and timing advance information for the mobile terminal.

5. The method of claim 1, further comprising:

sending a handover confirm message to the target base station indicating that handover is completed, wherein the first status report is transmitted to the target base station after sending the handover confirm message.

6. The method of claim 5, wherein the second status report is received from the target base station after handover is completed.

7. The method of claim 1, wherein the first status report is transmitted using a handover confirm message.

* * * * *